United States Patent
Hwu et al.

(10) Patent No.: US 10,001,565 B2
(45) Date of Patent: Jun. 19, 2018

(54) POSITIONING SYSTEM, ONBOARD POSITIONING DEVICE AND POSITIONING METHOD THEREOF

(71) Applicant: Industrial Technology Research Institute, Hsinchu (TW)

(72) Inventors: Jing-Shyang Hwu, Hsinchu County (TW); Yung-Cheng Chao, Hsinchu (TW); Po-Fan Wang, Taoyuan (TW); Po-Chun Kang, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 47 days.

(21) Appl. No.: 15/391,849

(22) Filed: Dec. 28, 2016

(65) Prior Publication Data
US 2017/0350986 A1    Dec. 7, 2017

(30) Foreign Application Priority Data
Jun. 2, 2016 (TW) .............................. 105117424 A

(51) Int. Cl.
*G01S 19/41* (2010.01)
*G01S 19/23* (2010.01)

(52) U.S. Cl.
CPC ............ *G01S 19/41* (2013.01); *G01S 19/235* (2013.01)

(58) Field of Classification Search
CPC ............................... G01S 19/41; G01S 19/235
See application file for complete search history.

(56) References Cited

U.S. PATENT DOCUMENTS

| | | | | |
|---|---|---|---|---|
| 4,833,481 A | * | 5/1989 | Shibano | G01S 1/14 340/902 |
| 5,323,322 A | | 6/1994 | Mueller et al. | |
| 5,365,516 A | * | 11/1994 | Jandrell | G01S 5/0009 340/991 |

(Continued)

FOREIGN PATENT DOCUMENTS

| | | |
|---|---|---|
| CN | 103454660 | 12/2013 |
| JP | 2001184593 | 7/2001 |

(Continued)

OTHER PUBLICATIONS

Eun-Kyu Lee et al., "RFID Assisted Vehicle Positioning in VANETs", Pervasive and Mobile Computing, Apr. 2012, 167-179.

(Continued)

*Primary Examiner* — Calvin Cheung
(74) *Attorney, Agent, or Firm* — JCIPRNET

(57) ABSTRACT

A positioning system having an onboard positioning device and a roadside device is provided. The onboard positioning device receives a plurality of first positioning signals and records a positioning moving locus of a vehicle according to the first positioning signals. The roadside device detects a real moving locus of the vehicle. The onboard positioning device obtains the real moving locus from the roadside device, and calculates a positioning calibration value according to coordinates of the positioning moving locus and coordinates of the real moving locus. Furthermore, the onboard positioning device receives a plurality of second positioning signals and calculates and outputs a plurality of calibrated positioning coordinates according to the second positioning signals and the positioning calibration value.

31 Claims, 4 Drawing Sheets

(56) References Cited

U.S. PATENT DOCUMENTS

| | | | |
|---|---|---|---|
| 5,548,516 A * | 8/1996 | Gudat | G01S 19/11 701/23 |
| 6,324,473 B1 | 11/2001 | Eschenbach | |
| 6,718,263 B1 * | 4/2004 | Glass | G07B 15/02 455/428 |
| 7,711,480 B2 | 5/2010 | Robbins | |
| 7,791,503 B2 * | 9/2010 | Breed | B60N 2/2863 340/989 |
| 7,898,432 B2 | 3/2011 | McNew et al. | |
| 9,036,509 B1 * | 5/2015 | Addepalli | H04W 4/046 370/259 |
| 9,755,850 B2 * | 9/2017 | Stolfus | H04L 12/6418 |
| 2002/0032506 A1 * | 3/2002 | Tokitsu | G07B 15/063 701/32.4 |
| 2002/0094821 A1 * | 7/2002 | Kennedy, Jr. | G01S 5/10 455/456.3 |
| 2003/0033083 A1 * | 2/2003 | Nakashima | G01C 21/3626 701/411 |
| 2004/0102893 A1 * | 5/2004 | Atkinson | G08G 1/0104 701/117 |
| 2004/0266457 A1 * | 12/2004 | Dupray | G01S 5/0268 455/456.5 |
| 2005/0002347 A1 | 1/2005 | Lee et al. | |
| 2009/0219900 A1 * | 9/2009 | Kokkinen | B61L 15/0027 370/338 |
| 2009/0231161 A1 * | 9/2009 | Malarky | G07B 15/063 340/933 |
| 2011/0263257 A1 * | 10/2011 | Kago | H04W 36/0083 455/436 |
| 2013/0093618 A1 | 4/2013 | Oh et al. | |
| 2014/0184441 A1 | 7/2014 | Hwu et al. | |
| 2015/0100224 A1 * | 4/2015 | Tsuda | G08G 1/0112 701/117 |
| 2015/0124895 A1 * | 5/2015 | Park | H04B 7/0626 375/260 |
| 2016/0189068 A1 * | 6/2016 | Amano | G06Q 10/0635 705/7.28 |
| 2016/0341557 A1 * | 11/2016 | Kondo | G01C 21/28 |
| 2017/0023945 A1 * | 1/2017 | Cavalcanti | G08G 1/0116 |
| 2017/0352263 A1 * | 12/2017 | Umehara | G08G 1/0133 |

FOREIGN PATENT DOCUMENTS

| | | |
|---|---|---|
| TW | I227332 | 2/2005 |
| TW | M372468 | 1/2010 |
| TW | 201020140 | 6/2010 |
| TW | I471582 | 2/2015 |

OTHER PUBLICATIONS

Gérard Lachapelle et al., "DGPS RTK Positioning Using a Reference Network", ION GPS, Sep. 2000, 1165-1171.

Gerhard Wübbena et al, "Reducing Distance Dependent Errors for Real-Time Precise DGPS Applications by Establishing Reference Station Networks", ION GPS, 1996, 1845-1852.

J. K. Ray et al., "GPS code and carrier multipath mitigation using a multiantenna system", IEEE Transactions on Aerospace and Electronic Systems, Jan. 2001, 183-195.

Penina Axelrad., "SNR-based multipath error correction for GPS differential phase", IEEE Transactions on Aerospace and Electronic Systems, Apr. 1996, 650-660.

Hsieh, "Reference-Station-Free Calibration Method for Global Postioning System Using Cooperative Vehicles," Master's thesis, Jun. 2012, Department of Computer Science, National Tsing Hua University.

Nima Alam et al., "Positioning Enhancement with Double Differencing and DSRC", ION GNSS, Sep. 21-24, 2010.

Christopher J. Comp et al., "Adaptive SNR-based carrier phase multipath mitigation technique", IEEE Transaction on Aerospace and Electronic Systems, Jan. 1998, 264-276.

"Office Action of Taiwan Counterpart Application", dated Nov. 11, 2016, p. 1-p. 8.

\* cited by examiner

POSITIONING SYSTEM, ONBOARD POSITIONING DEVICE AND POSITIONING METHOD THEREOF

CROSS-REFERENCE TO RELATED APPLICATION

This application claims the priority benefits of Taiwan application serial no. 105117424, filed on Jun. 2, 2016. The entirety of the above-mentioned patent application is hereby incorporated by reference herein and made a part of this specification.

TECHNICAL FIELD

The disclosure relates to a positioning system, an onboard positioning device and a positioning method thereof.

BACKGROUND

As the popularity of the Global Positioning System (GPS), people's lives have been quietly infiltrated by the GPS in recent years. The technology of GPS is widely used for vehicle routing guidance and improving road safety. Without any correction or calibration, GPS may have errors of about 10-15 meters. A differential GPS (DGPS) technology is a traditional positioning correction technique. Although the DGPS may be reduced the error to 3-5 meters, however, the error correction systems (DGPS) require to set the physical entities such as the base station, the main control station, and a geostationary satellite. The implementation costs of physical entities of the error correction systems are expensive and the GPS device has to communicate with the main control station to obtain calibration data. DGPS broadcasts the correction information (for example, the positioning correction vector or the difference between virtual distances) to improve the positioning accuracy. The main sources of the positioning errors are atmospheric effects error (such as ionosphere and troposphere), ephemeris error, multipath errors, etc. DGPS may reduce the errors due to the atmospheric effects error and the ephemeris error, but may not reduce the multipath errors. In particular, multipath interferences in different locations by different satellites are not the same in a complex urban environment. In the case that the positioning correction information in DGPS may not provide the amount of correction of multipath errors, the positioning accuracy may not reach the lane level. Therefore, it's an issue on how to improve the positioning accuracy so as to implement applications of collaborative road safety, navigation and other applications of complex junctions.

SUMMARY

The exemplary embodiments of disclosure provide a positioning system, an onboard positioning device and a positioning method thereof.

An exemplary embodiment of the disclosure relates to a positioning system. The positioning system comprises an onboard positioning device placed in a vehicle, and a roadside device. The onboard positioning device receives a plurality of first positioning signals from a satellite positioning system within one time interval, and records a positioning moving locus of the vehicle according to the plurality of first positioning signals, wherein the positioning moving locus has a plurality of positioning moving coordinates. The roadside device detects a real moving locus of the vehicle within the one time interval, wherein the real moving locus has a plurality of real moving coordinates. Wherein the onboard positioning device obtains the real moving locus from the roadside device, calculates a positioning calibration value according to the plurality of positioning moving coordinates of the positioning moving locus and the plurality of real moving coordinates of the real moving locus. Wherein, the onboard positioning device receives a plurality of second positioning signals from the satellite positioning system, calculates and outputs a plurality of calibrated positioning coordinates of the vehicle according to the plurality of second positioning signals and the positioning calibration value.

Another exemplary embodiment of the disclosure relates to an onboard positioning device placed in a vehicle. The onboard positioning device comprises a positioning signal receiver circuit, a wireless communication circuit, and a processing circuitry. The positioning signal receiver circuit, within one time interval, receives a plurality of first positioning signals from a satellite positioning system. The wireless communication circuit obtains a real moving locus of the vehicle within the one time interval from a roadside device, wherein the real moving locus has a plurality of real moving coordinates. The processing circuitry is coupled to the positioning signal receiver circuit and the wireless communication circuit. Wherein the processing circuitry records a positioning moving locus of the vehicle according to the plurality of first positioning signals, and the positioning moving locus has a plurality of positioning moving coordinates. The processing circuitry calculates a positioning calibration value according to the plurality of positioning moving coordinates of the positioning moving locus and the plurality of real moving coordinates of the real moving locus. The onboard positioning device receives a plurality of second positioning signals from the satellite positioning system. The processing circuitry calculates and outputs a plurality of calibrated positioning coordinates of the vehicle according to the plurality of second positioning signals and the positioning calibration value.

Another exemplary embodiment of the disclosure relates to a positioning method, adapted to an onboard positioning device in a vehicle. The positioning method includes receiving a plurality of first positioning signals from a satellite positioning system within one time interval; recording a positioning moving locus of the vehicle according to the plurality of first positioning signals, wherein the positioning moving locus has a plurality of positioning moving coordinates; obtaining a real moving locus of the vehicle within the one time interval from a roadside device, wherein the real moving locus has a plurality of real moving coordinates. The positioning method further includes calculating a positioning calibration value according to the plurality of positioning moving coordinates of the positioning moving locus and the plurality of real moving coordinates of the real moving locus; receiving a plurality of second positioning signals from the satellite positioning system; and calculating and outputting a plurality of calibrated positioning coordinates of the vehicle according to the plurality of second positioning signals and the positioning calibration value.

The foregoing will become better understood from a careful reading of a detailed description provided herein below with appropriate reference to the accompanying drawings.

DETAILED DESCRIPTION OF DISCLOSED EMBODIMENTS

Figure 1:
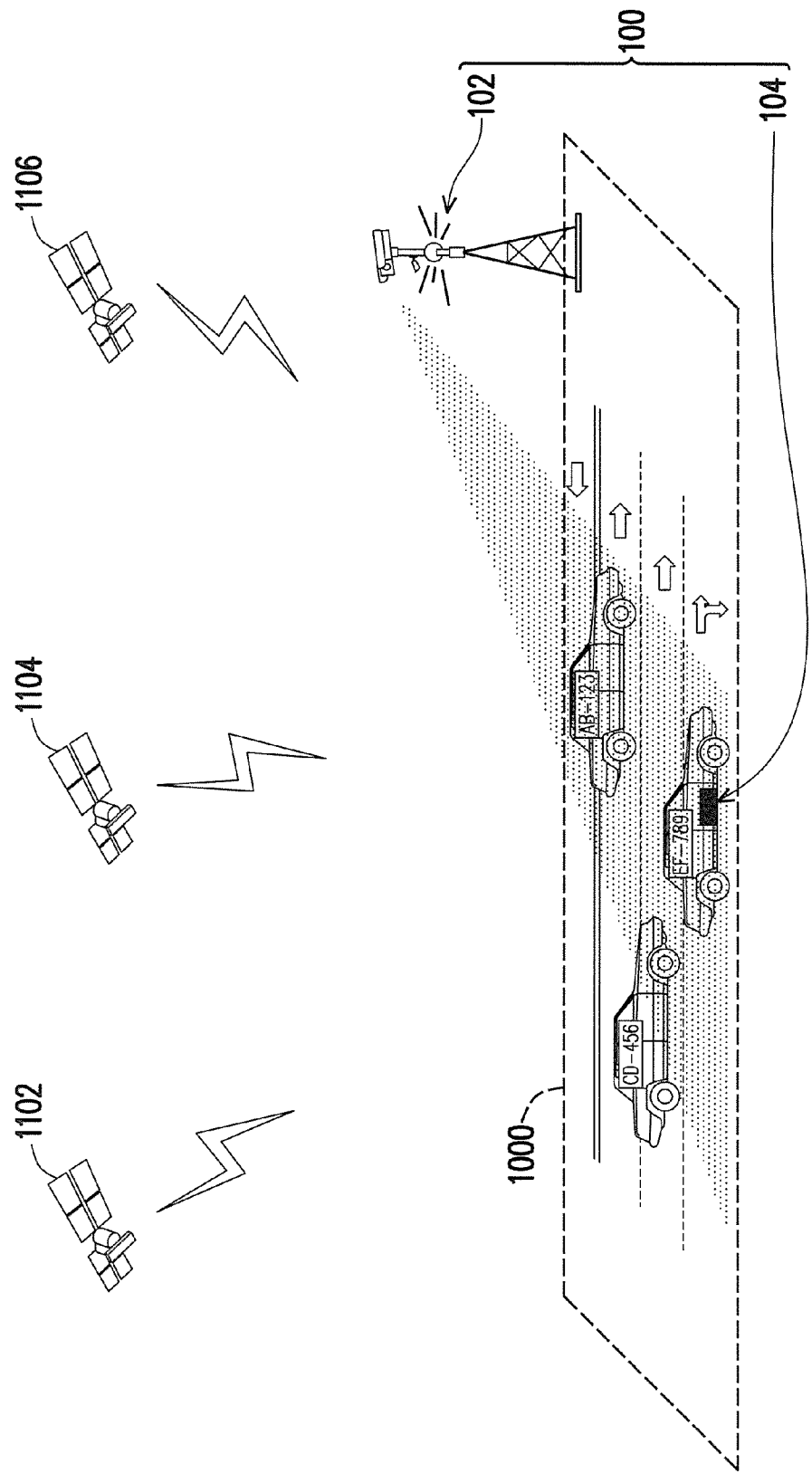
FIG. 1 and FIG. 2 illustrate the operation of a positioning system according to an exemplary embodiment of the disclosure.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

Figure 2:
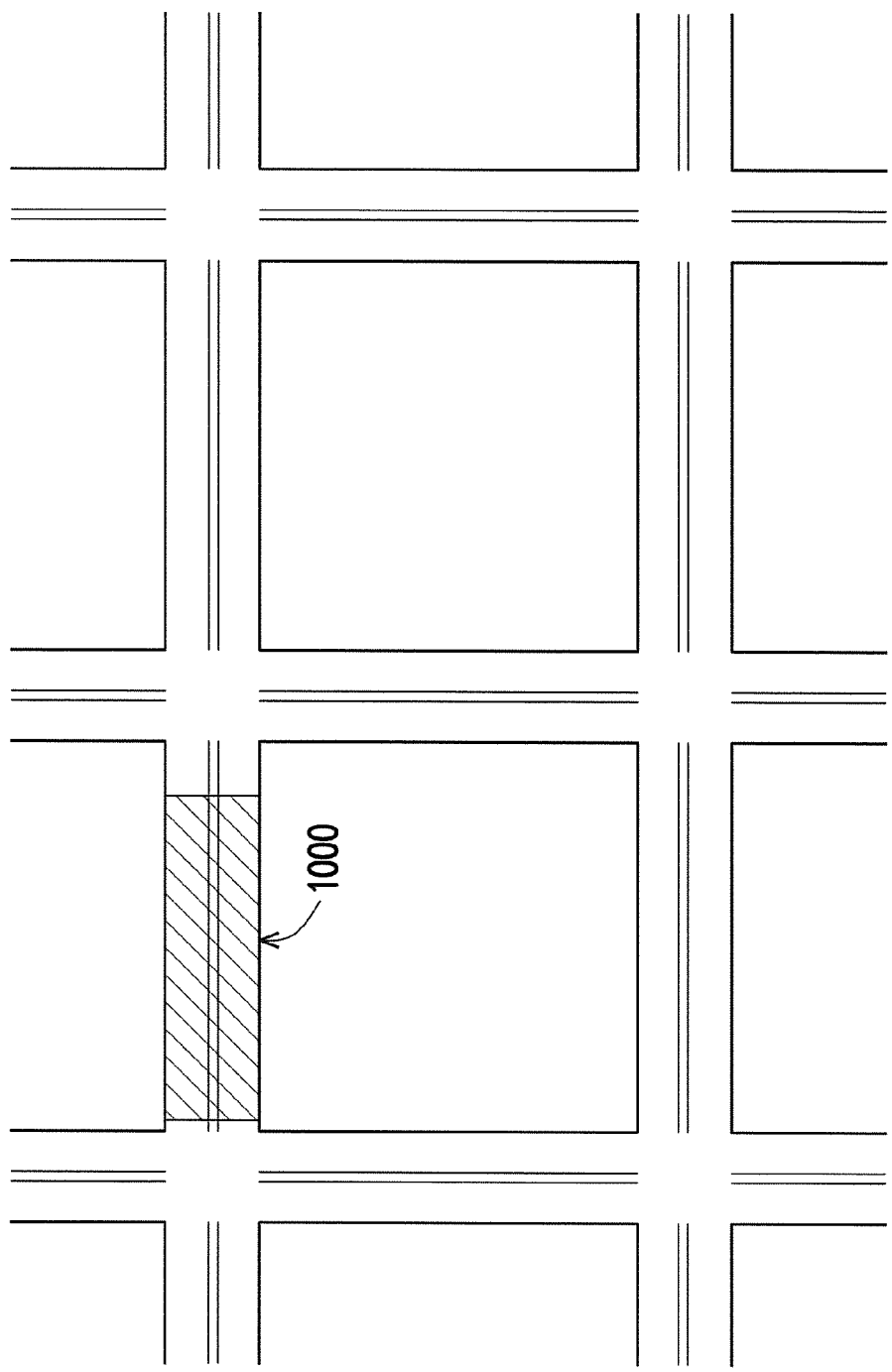

FIG. 1 and FIG. 2 illustrate the operation of a positioning system according to an exemplary embodiment of the disclosure.

Referring to FIG. 1 and FIG. 2, the positioning system 100 includes a roadside device 102 and an onboard positioning device 104. The roadside device 102, installed in a positioning correction area 1000, detects a real moving locus of the vehicles in the positioning correction area 1000 within one time interval. The roadside device 102 broadcasts the real moving locus of the vehicles to the vehicles in the positioning correction area 1000. The onboard positioning device 104 is placed in a vehicle. The onboard positioning device 104 receives positioning signals from at least one satellite of a satellite positioning system (SPS) (such as GPS satellites) to calculate the positioning coordinates of the vehicle and record the positioning moving locus of the vehicle when the onboard positioning device 104 passes through the positioning correction area 1000 within the one time interval, wherein the positioning moving locus has a plurality of positioning moving coordinates. When the vehicle with the onboard positioning device 104 passes through the positioning correction area 1000, the onboard positioning device 104 receives the real moving locus of the vehicle from the roadside device 102, wherein the real moving locus has a plurality of real moving coordinates. The onboard positioning device 104 compares the positioning moving locus of the vehicle with the real moving locus of the vehicle to obtain a positioning calibration value. Then, when the onboard positioning device 104 receives the positioning signals from the satellite of the SPS to calculate the positioning coordinates of the vehicle, the onboard positioning device 104 adjusts the calculated positioning coordinates or the parameters for calculating the positioning coordinates according to the positioning calibration value to obtain a plurality of calibrated positioning coordinates. Since the positioning calibration value is calculated based on the error between the positioning moving locus and the real moving locus of the vehicle when the vehicle passes through the positioning correction area 1000, therefore, the positioning of the vehicle under the positioning system 100 are more accurate. The error for the positioning is less than 1 meter, which may meet the needs of cooperative traffic safety, navigation and other applications of complex junctions.

Figure 3:
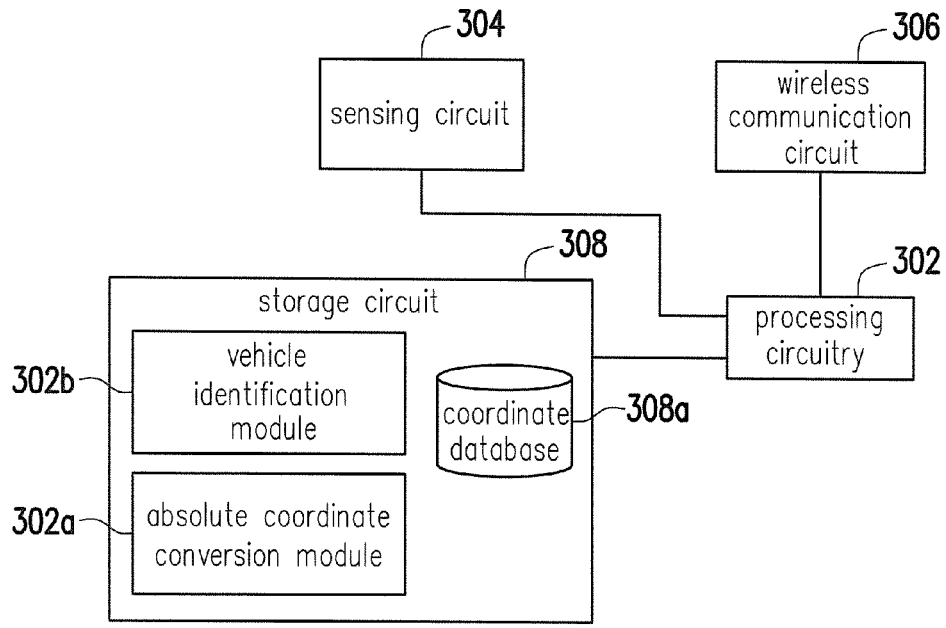
FIG. 3 is a schematic diagram illustrating a roadside device according to an exemplary embodiment of the disclosure.

FIG. 3 is a schematic diagram illustrating the roadside device 102 according to an exemplary embodiment of the disclosure.

Referring to FIG. 3, the roadside device 102 includes a processing circuitry 302, a sensing circuit 304, a wireless communication circuit 306, and a storage circuit 308.

The processing circuitry 302 is configured to control a whole operation of the roadside device 102. For example, the processing circuitry 302 may be, but not limited to a central processing unit (CPU), a micro-processor, a digital signal processor (DSP), an application specific integrated circuit (ASIC), a programmable logic device (PLD) or an embedded controller. The sensing circuit 304 is coupled to the processing circuitry 302, and is configured to detect the vehicles in the positioning correction area 1000 and record relative moving coordinates of each of the vehicles. For example, the sensing circuit 304 may use a radar detection technique or an image recognition technology to continuously sense the relative moving coordinates of each vehicle. The wireless communication circuit 306 is coupled to the processing circuitry 302, and is configured to transmit the real moving locus of each vehicle to the onboard positioning device 104. The wireless communication circuit 306 may support such as Global System for Mobile Communications (GSM), Personal Handy-phone System (PHS), Code Division Multiple Access (CDMA) system, Wireless Fidelity (WiFi), Worldwide Interoperability for Microwave Access (WiMAX), 3GPP, Long Term Evolution (LTE), Wireless Access in Vehicular Environments/Dedicated Short Range Communication (WAVE/DSRC), or any combination of communication chips. The storage circuit 308 is configured to store the detected moving coordinates and the code of the roadside device 102. The storage circuit 308 may be, for example, a magnetic disk or flash memory.

In the present exemplary embodiment, the sensing circuit 304 detects the vehicles in the positioning correction area 1000 and records the relative moving coordinates and the corresponding times of the relative moving coordinates (within the one time interval) of each of the vehicles. For example, in the present exemplary embodiment, the sensing circuit 304 has photographic features, and it will continue to take pictures in the positioning correction area 1000 to capture the images. In particular, the sensing circuit 304 calculates the relative moving coordinates according to the position of each of the vehicles in the captured images. For example, the captured images will be projected onto the plane of the positioning correction area 1000 by the sensing circuit 304 to calculate a correspondence between each position point in the captured images and each position point in the positioning correction area 1000. After identifying each vehicle in the images, the sensing circuit 304 calculates the relative moving coordinates according to the correspondence. However, detecting the relative moving coordinates of each one of the vehicles in the positioning correction area 1000 by the image recognition technology is considered as an exemplary embodiment only, a scope of the disclosure is not limited thereto. In another exemplary embodiment, the sensing circuit 304 may be a radar device, which emits electromagnetic waves and receives the reflected object electromagnetic waves, thereby calculating the relative moving coordinates of the object with respect to the sensing circuit 304. In the present exemplary embodiment, the sensing circuit 304 stores the relative moving coordinates and the corresponding times of the relative moving coordinates of each of the vehicles in the storage circuit 308. The storage circuit 308 includes a coordinate database 308a for storing a plurality of data tables to record the relative moving coordinates of the vehicles. For example, the coordinate database 308a may be a Relational Database Management System (RDBMS) or an Object-oriented Database Management System (ODBMS), and may be implemented by using the Structured Query Language (SQL) or NoSQL (also called Not Only SQL).

In the present exemplary embodiment, the processing circuitry 302 transforms the relative moving coordinates of the vehicles detected by the sensing circuit 304 to generate the real moving coordinates corresponding to the vehicles, respectively. To be specific, when the roadside device 102 is installed in the positioning correction area 1000, the absolute positioning coordinate of the roadside device 102 from the SPS may be confirmed via measurement, and the absolute positioning coordinate may be recorded in the roadside device 102. For example, the absolute positioning coordinate may be stored in the storage circuit 308. Therefore, the processing circuitry 302 transforms the relative moving coordinates into the real moving coordinates of the vehicles, respectively, according to the absolute positioning coordinate of the roadside device 102, and calculates the real moving locus of each of the vehicles. Moreover, the processing circuitry 302 may identify an identification (such as the license plate number or other unique vehicle information, for example, vehicle identification number (YIN)) of each of the vehicles detected by the sensing circuit 304. For example, in the present exemplary embodiment, the identification of each vehicle is the license plate number, and the processing circuitry 302 may identify the license plate number of each vehicle in the captured images by the sensing circuit 304. The method of identifying the license plate number may use the well-known license plate recognition technology (for example, image recognition method or algorithm, optical character recognition (OCR)), and the details thereof are not described here. It should be noticed that in another exemplary embodiment, it may use a Radio Frequency Identification (RFID) system to obtain the identification of each vehicle. The disclosure does not limit on the schemes of vehicle identification.

In the present exemplary embodiment, the operation of transforming the relative moving coordinates into the real moving coordinates of each vehicle and calculating the real moving locus of each vehicle described above are implemented by an absolute coordinate conversion module 302a including a plurality of program codes. And the operation of vehicle identification described above is implemented by a vehicle identification module 302b including a plurality of program codes. In other words, the absolute coordinate conversion module 302a and the vehicle identification module 302b may be implemented by software modules and stored in the storage circuit 308. When the roadside device 102 is operating, the program codes of the absolute coordinate conversion module 302a and the vehicle identification module 302b are loaded from the storage circuit 308, and transforming the relative moving coordinates into the real moving coordinates of vehicles, respectively, and identifying each vehicle described above are executed by the processing circuitry 302. However, the disclosure is not limited thereto. In another exemplary embodiment, transforming the relative moving coordinates into the real moving coordinates of each one of the vehicles and identifying each vehicle described above are executed by the processing circuitry 302, which is implemented by hardware modules.

In the present exemplary embodiment, the processing circuitry 302 encapsulates the real moving coordinates respectively corresponding to vehicles, the identification corresponding to each vehicle, and the corresponding times of the real moving coordinates as packets, and the wireless communication circuit 306 broadcasts the packets. The time system of the roadside device 102 is synchronized with the time system of the SPS. For example, the satellite positioning signal receiver (not shown) of the roadside device 102 receives the time information from the SPS for time synchronization. Referring to FIG. 1, the processing circuitry 302 identifies the identification of each vehicle, calculates the real moving coordinates of each vehicle, and broadcasts the sensing information of each vehicle. Wherein the sensing information includes the real moving coordinates, the corresponding times of the real moving coordinates, and the identification of each vehicle. For example, the sensing information of the vehicle, corresponding to the license plate number AB-123 includes $\{[(X_{11}, Y_{11}, T_{11}), (X_{12}, Y_{12}, T_{12}), (X_{13}, Y_{13}, T_{13}), \ldots], AB\text{-}123\}$. Wherein AB-123 is the identification of the vehicle, $\{[(X_{11}, Y_{11}, T_{11}), (X_{12}, Y_{12}, T_{12}), (X_{13}, Y_{13}, T_{13}), \ldots]\}$ are a plurality of real moving coordinates and corresponding times thereof of the vehicle having the identification AB-123. Wherein X represents an X-axis coordinate, Y represents a Y-axis coordinate, and T represents time. Similarly, the sensing information of the vehicle corresponding to the license plate number CD-456- includes $\{[(X_{21}, Y_{21}, T_{21}), (X_{22}, Y_{22}, T_{22}), (X_{23}, Y_{23}, T_{23}), \ldots], CD\text{-}456\}$. The sensing information of the vehicle corresponding to the license plate number EF-789 includes $\{[(X_{31}, Y_{31}, T_{31}), (X_{32}, Y_{32}, T_{32}), (X_{33}, Y_{33}, T_{33}), \ldots], EF\text{-}789\}$.

Figure 4:
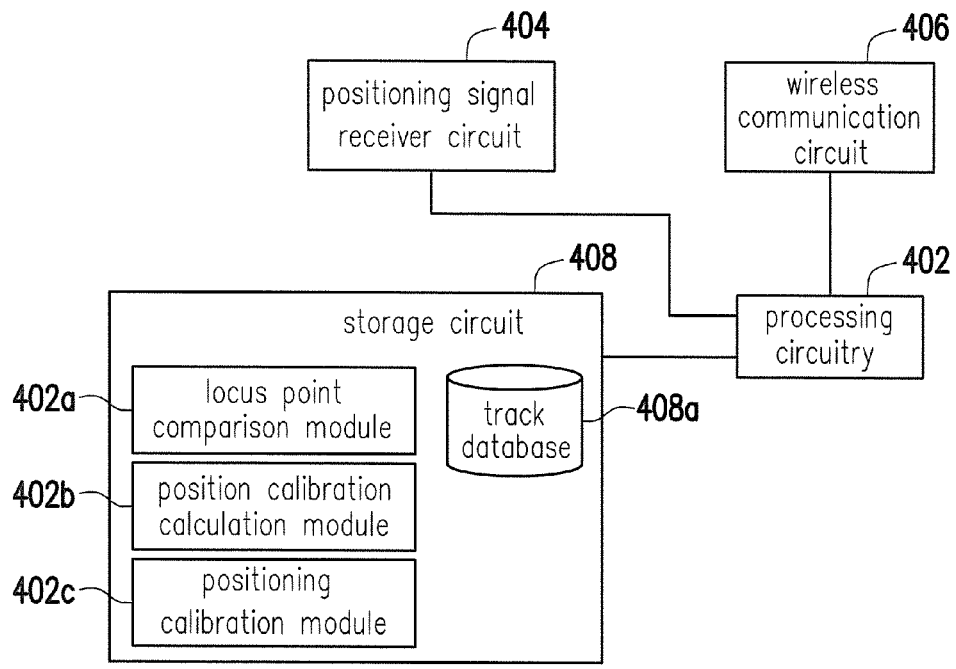
FIG. 4 is a schematic diagram illustrating an onboard positioning device according to an exemplary embodiment of the disclosure.

FIG. 4 is a schematic diagram illustrating the onboard positioning device 104 according to an exemplary embodiment of the disclosure.

Referring to FIG. 4, the onboard positioning device 104 includes a processing circuitry 402, a positioning signal receiver circuit 404, a wireless communication circuit 406, and a storage circuit 408.

The processing circuitry 402 is configured to control a whole operation of the onboard positioning device 104. The processing circuitry 302 may be, but not limited to a CPU, a micro-processor, a DSP, an ASIC, a PLD or an embedded controller. The positioning signal receiver circuit 404 is coupled to the processing circuitry 402, and is configured to receive the positioning signals from the satellites of the SPS. For example, the positioning signal receiver circuit 404 may support communication protocol such as Global Positioning System (GPS), Galileo Positioning System or Global Navigation Satellite System (GLONASS). The wireless communication circuit 406 is coupled to the processing circuitry 402, and is configured to receive the sensing information of the vehicle from the roadside device 102. The wireless communication circuit 406 may support such as GSM, PHS, CDMA system, WiFi, WiMAX, 3GPP, LTE, WAVE/DSRC, or any combination of communication chips. The storage circuit 408 is configured to store the detected moving coordinates and the code of the onboard positioning device 104. The storage circuit 408 may be, for example, a magnetic disk or a flash memory.

In the present exemplary embodiment, when the onboard positioning device 104 is operating, the positioning signal receiver circuit 404 receives the positioning signals from at least one satellite of the SPS, and the processing circuitry 402 calculates the positioning locations (that is, positioning coordinates) of the onboard positioning device 104 according to the positioning signals received from the positioning signal receiver circuit 404. To be specific, GPS works as a distance measurement, using the three-point technology to obtain the location of the receiver according to the distances between the satellites and the receiver. For example, the processing circuitry 402 obtains a first distance between the onboard positioning device 104 and a first satellite 1102 according to the positioning signals received from the first satellite 1102 by the positioning signal receiver circuit 404, a second distance between the onboard positioning device 104 and a second satellite 1104 according to the positioning signals received from the second satellite 1104 by the positioning signal receiver circuit 404, and a third distance between the onboard positioning device 104 and a third satellite 1106 according to the positioning signals received from the third satellite 1106 by the positioning signal receiver circuit 404. The processing circuitry 402 calculates the positioning coordinates of the onboard positioning device 104 according to the location of the first satellite 1102, the location of the second satellite 1104, the location of the third satellite 1106, the first distance between the onboard positioning device 104 and the first satellite 1102, the second distance between the onboard positioning device 104 and the second satellite 1104, and the third distance between the onboard positioning device 104 and the third satellite 1106. It should be noted that the SPS including three satellites is considered as an exemplary embodiment only, the SPS including more than three satellites can be made to the disclosure.

In the present exemplary embodiment, when a vehicle equipped with the onboard positioning device 104 (for example, the license plate number of the vehicle is EF-789) passes through the positioning correction area 1000, the wireless communication circuit 406 of the onboard positioning device 104 receives the sensing information broadcasted from the wireless communication circuit 306 of the roadside device 102. The sensing information broadcasted from the wireless communication circuit 306 of the roadside device 102 includes the real moving coordinates, the corresponding times of the real moving coordinates, and the identification of the vehicle, therefore, the processing circuitry 402 of the onboard positioning device 104 can identify the sensing information of its corresponding vehicle (for example, the vehicle having the license plate number EF-789), and retrieve the real moving coordinates and the corresponding times of the corresponding vehicle from the sensing information. The processing circuitry 402 will store the real moving coordinates and the corresponding times of the real moving coordinates in the storage circuit 408. For example, the storage circuit 408 may include a track database 408a configured to store a plurality of data tables to record of the positioning moving locus and the real moving locus of the vehicle, wherein the positioning moving locus has a plurality of positioning moving coordinates and the real moving locus has a plurality of real moving coordinates. For example, the track database 408a may be a RDBMS or an ODBMS, and may be implemented by using the SQL or NoSQL.

In the present exemplary embodiment, the processing circuitry 402 of the onboard positioning device 104 executes synchronous comparison of locus points based on the corresponding times of the real moving coordinates. To be specific, a time period (also referred to as "time interval") of a vehicle equipped with the onboard positioning device 104 (for example, the vehicle having the license plate number EF-789) passes through the positioning correction area 1000, the processing circuitry 402 calculates a plurality of positioning moving coordinates of the onboard positioning device 104 according to the positioning signals received from the positioning signal receiver circuit 404. The processing circuitry 402 obtains the positioning moving locus according to the plurality of positioning moving coordinates. And, the corresponding times of the plurality of positioning moving coordinates (within the one time interval) are synchronized with the SPS. Therefore, after the roadside device 102 receives the real moving locus of the corresponding vehicle, the processing circuitry 402 compares each of the real moving coordinates of the real moving locus with each of the positioning moving coordinates of the positioning moving locus based on the corresponding times of the real moving coordinates and the corresponding times of the positioning moving coordinates. The processing circuitry 402 calculates the positioning calibration value based on the result of the comparison described above, and the calibrated positioning coordinates according to the positioning calibration value after the onboard positioning device 104 leaving the positioning correction area 1000. Namely, when a vehicle passes through the positioning correction area 1000, the onboard positioning device 104 calculates the positioning calibration value according to the positioning moving locus and the real moving locus of the vehicle. Then, when the onboard positioning device 104 leaves the positioning correction area 1000 and continuously receives the positioning signals, the onboard positioning device 104 generates the calibrated positioning coordinates based on the positioning signals and the positioning calibration value, so that the positioning of the vehicle is more accurate.

For example, in the present exemplary embodiment, the processing circuitry 402 respectively calculates a corresponding first-axis differences between each coordinate of a first axis (for example, X-axis) of the real moving locus retrieved from the sensing information received by the roadside device 102 (for example, $\{[(X_{31}, Y_{31}, T_{31}), (X_{32}, Y_{32}, T_{32}), (X_{33}, Y_{33}, T_{33}), \ldots], EF\text{-}789\}$) and each coordinate of the first axis of the positioning moving locus (for example, $\{[(X_1, Y_1, T_1), (X_2, Y_2, T_2), (X_3, Y_3, T_3), \ldots]\}$) based on the corresponding times of the real moving coordinates The processing circuitry 402 respectively calculates a corresponding second-axis differences between each coordinate of a second axis (for example, Y-axis) of the real moving locus and each coordinate of the second axis of the positioning moving locus. The first-axis differences and the second-axis differences may be expressed as the following equation (1). Then, the processing circuitry 402 calculates a first-axis calibration value and a second-axis calibration value according to these $d\vec{T}t$, and outputs the first-axis calibration value and the second-axis calibration value as the positioning calibration value. For example, the processing circuitry 402 may obtain the first-axis calibration value according to an average value of the first-axis differences, and obtain the second-axis calibration value according to an average value of the second-axis differences. Then, when the onboard positioning device 104 receives the positioning signals, the processing circuitry 402 calculates the positioning coordinates according to the positioning signals. The processing circuitry 402 obtains the calibrated positioning coordinates by adding up the positioning coordinates of the first axis and the first-axis calibration value, and adding up the positioning coordinates of the second axis and the second-axis calibration value, to achieve the positioning calibration of the vehicle having the license plate number-EF-789.

$$d\vec{T}t=(Xt,Yt)-(X3t,Y3t) t=1\sim n \qquad \text{equation (1)}$$

It should be noted that the positioning calibration described above is firstly calculating the positioning coordinates, then adjusting the positioning coordinates by the positioning calibration value (for example, the first-axis calibration value and the second-axis calibration value) to obtain the calibrated positioning coordinates, but the scope of the disclosure is not limited thereto. In another exemplary embodiment, the processing circuitry 402 may firstly calculate a corresponding virtual distance difference of each satellite in the SPS, then calculates a corresponding calibrated positioning coordinates. To be specific, the processing circuitry 402 respectively calculates a corresponding distance (hereinafter referred to as an actual distances of a satellite) between each coordinate of the real moving locus (for example, $\{[(X_{31}, Y_{31}, T_{31}), (X_{32}, Y_{32}, T_{32}), (X_{33}, Y_{33}, T_{33}), \ldots], \text{EF-789}\}$) and each of the first satellite 1102, the second satellite 1104, and the third satellite 1106 based on the corresponding times (within the one time interval) of the real moving coordinates. And the processing circuitry 402 respectively calculates a corresponding distance (hereinafter referred to as a virtual distances of a satellite) between each coordinate of the positioning moving locus (for example, $\{[(X_1, Y_1, T_1), (X_2, Y_2, T_2), (X_3, Y_3, T_3), \ldots]\}$) and each of the first satellite 1102, the second satellite 1104, and the third satellite 1106 based on the corresponding times (within the one time interval). The processing circuitry 402 calculates a corresponding virtual distance difference of each satellite according to the actual distance of the satellite and the virtual distance of the satellite of the corresponding times (the one time interval). For example, the processing circuitry 402 calculates each of virtual distance differences of the first satellite 1102, each of virtual distance differences of the second satellite 1104, and each of virtual distance differences of the third satellite 1106 based on each of the corresponding times, and obtains the positioning calibration value according to an average value of the virtual distance differences of the first satellite 1102, an average value of the virtual distance differences of the second satellite 1104, and an average value of the virtual distance differences of the third satellite 1106. Then, when the onboard positioning device 104 receives the positioning signals, the processing circuitry 402 calculates, a distance (hereinafter referred to as a first-satellite virtual distance) between the onboard positioning device 104 and the first satellite 1102 according to the positioning signals, a distance (hereinafter referred to as a second-satellite virtual distance) between the onboard positioning device 104 and the second satellite 1104 according to the positioning signals, a distance (hereinafter referred to as a third-satellite virtual distance) between the onboard positioning device 104 and the third satellite 1104 according to the positioning signals. And the processing circuitry 402, respectively adjusts the first-satellite virtual distance, the second-satellite virtual distance, and the third-satellite virtual distance according to the virtual distance differences of the first satellite 1102, the virtual distance differences of the second satellite 1104, and the virtual distance differences of the third satellite 1106, and calculates the positioning calibration value and the calibrated positioning coordinates of the onboard positioning device 104 according to an adjusted first-satellite virtual distance, an adjusted second-satellite virtual distance, and an adjusted third-satellite virtual distance, to achieve the positioning calibration of the vehicle having the license plate number EF-789.

In the present exemplary embodiment, the operation of synchronous comparison of locus points described above is implemented by a locus point comparison module 402a, the positioning calibration value described above is implemented by a positioning calibration calculation module 402b, and the positioning calibration described above is implemented by a positioning calibration module 402c. For example, the locus point comparison module 402a, the positioning calibration calculation module 402b, and positioning calibration module 402c are implemented by software modules and stored in the storage circuit 408. When the onboard positioning device 104 is operating, the program codes of the locus point comparison module 402a, the positioning calibration calculation module 402b, and positioning calibration module 402c are loaded from the storage circuit 408. Also, the operation of synchronous comparison of locus points, the positioning calibration value, and the positioning calibration for obtaining the calibrated positioning the processing circuitry 402. However, the scope of the disclosure is not limited thereto. In another exemplary embodiment, the operation of synchronous comparison of locus points, the positioning calibration value, and the positioning calibration for obtaining the calibrated positioning coordinates from the positioning calibration value described above may be implemented by hardware circuit in the processing circuitry 402.

Figure 5:
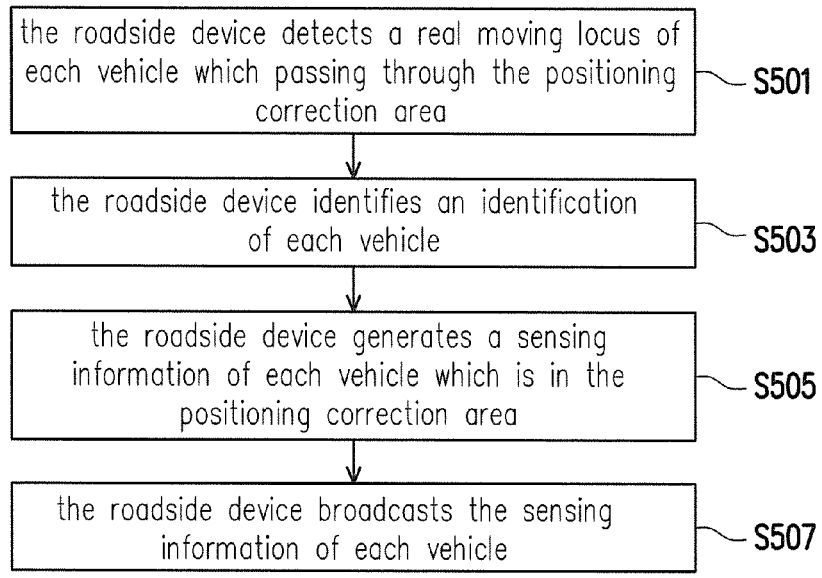
FIG. 5 and FIG. 6 are a flowchart illustrating a positioning method according to an exemplary embodiment of the disclosure.
Figure 6:
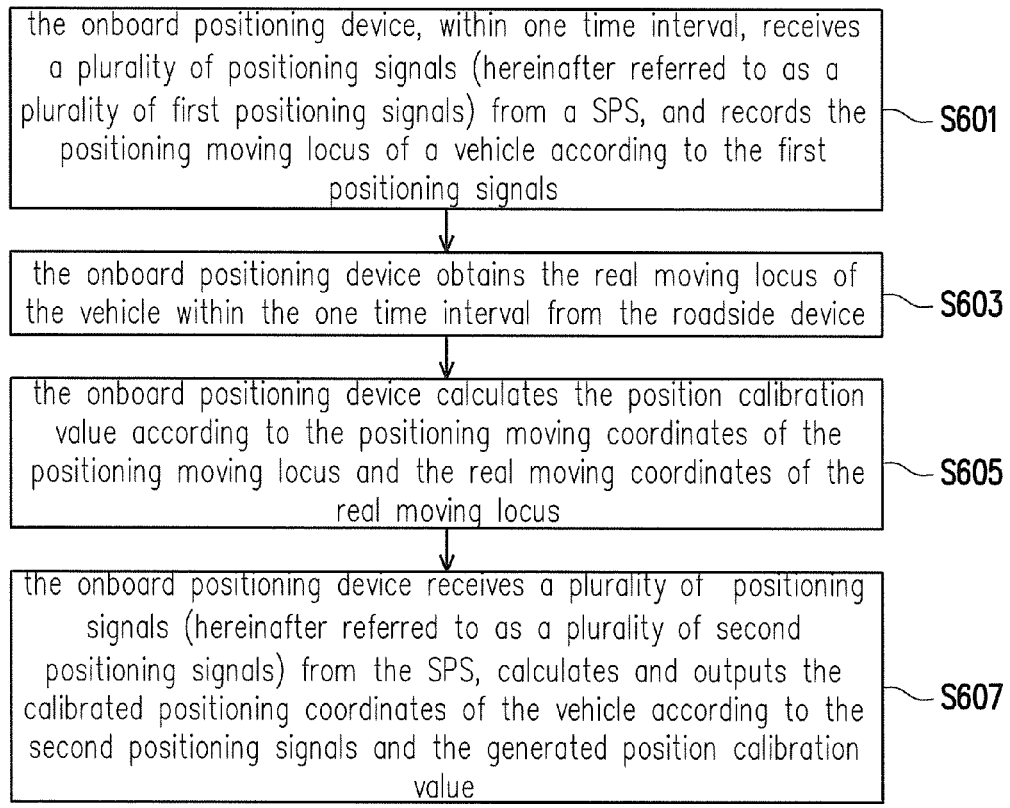

FIG. 5 and FIG. 6 are a flowchart illustrating a positioning method according to an exemplary embodiment of the disclosure.

Referring to FIG. 5, in step S501, the roadside device 102 detects a real moving locus of each vehicle passing through the positioning correction area 1000, wherein the real moving locus has a plurality of real moving coordinates. In step S503, the roadside device 102 identifies an identification of said each vehicle. In step S505, the roadside device 102 generates a sensing information of said each vehicle in the positioning correction area 1000 according to the identification of said each vehicle, the real moving coordinates of said each vehicle, the corresponding times of the real moving coordinates of said each vehicle. In step S507, the roadside device 102 broadcasts the sensing information of said each vehicle.

Referring to FIG. 6, in step S601, the onboard positioning device 104 receives a plurality of positioning signals (hereinafter referred to as a plurality of first positioning signals) within one time interval from a SPS, and records the positioning moving locus (that is, the positioning moving locus corresponding to the one time interval) of a vehicle according to the first positioning signals, wherein the positioning moving locus has a plurality of positioning moving coordinates.

In step S603, the onboard positioning device 104 obtains the real moving locus of the vehicle within the one time interval from the roadside device 102, wherein the real moving locus has a plurality of real moving coordinates. To be specific, the onboard positioning device 104 receives the sensing information of the vehicle in the positioning correction area 1000 from the roadside device 102, retrieves the real moving locus from the sensing information, and stores the real moving locus of the vehicle equipped with the onboard positioning device 104. The onboard positioning device 104 identifies the real moving locus and the corresponding times of the real moving locus of the vehicle equipped with the onboard positioning device 104 based on the identification of the received sensing information.

In step S605, the onboard positioning device 104 calculates the positioning calibration value according to the positioning moving coordinates of the positioning moving locus and the real moving coordinates of the real moving locus. For example, the onboard positioning device 104 compares each of the real moving coordinates of the real moving locus with each of the positioning moving coordinates of the positioning moving locus based on the corresponding times within the one time interval, and generates the corresponding positioning calibration value according to the result of the comparison described above.

In step S607, the onboard positioning device 104 receives a plurality of positioning signals (hereinafter referred to as a plurality of second positioning signals) from the SPS, calculates and outputs the calibrated positioning coordinates of the vehicle according to the second positioning signals and the generated positioning calibration value. For example, the onboard positioning device 104 outputs the calculated calibrated positioning coordinates to a navigation map of the vehicle and displays the locations of the vehicle.

In summary, the positioning system, the onboard positioning device, and the positioning method provided by the exemplary embodiments of the disclosure may eliminate the positioning error of regional multipath interference and the noise error of the GPS chip to continuously correct the positioning and provide more accurate positioning coordinates.

It will be apparent to those skilled in the art that various modifications and variations can be made to the disclosure. It is intended that the specification and examples be considered as exemplary embodiments only, with a scope of the disclosure being indicated by the following claims and their equivalents.

What is claimed is:

1. An positioning system, comprising:
    an onboard positioning device placed in a vehicle, receiving a plurality of first positioning signals from a satellite positioning system within one time interval, and recording a positioning moving locus of the vehicle according to the plurality of first positioning signals, wherein the positioning moving locus has a plurality of positioning moving coordinates; and
    a roadside device, detecting a real moving locus of the vehicle within the one time interval, wherein the real moving locus has a plurality of real moving coordinates;
    wherein the onboard positioning device obtains the real moving locus from the roadside device, calculates a positioning calibration value according to the plurality of positioning moving coordinates of the positioning moving locus and the plurality of real moving coordinates of the real moving locus,
    wherein the onboard positioning device receives a plurality of second positioning signals from the satellite positioning system, calculates and outputs a plurality of calibrated positioning coordinates of the vehicle according to the plurality of second positioning signals and the positioning calibration value.

2. The positioning system as claimed in claim 1, wherein the roadside device comprises a sensing circuit and a processing circuitry, the sensing circuit detects a plurality of relative moving coordinates of the vehicle, and the processing circuitry obtains the real moving locus of the vehicle according to an absolute positioning coordinate of the roadside device and the plurality of relative moving coordinates of the vehicle.

3. The positioning system as claimed in claim 2, wherein the sensing circuit of the roadside device uses a radar detection technique or an image recognition technology to continuously sense the plurality of relative moving coordinates of the vehicle.

4. The positioning system as claimed in claim 2, wherein the process g circuitry of the roadside device transforms the plurality of relative moving coordinates into the plurality of real moving coordinates of the vehicle according to the absolute positioning coordinate.

5. The positioning system as claimed in claim 2, wherein the roadside device further comprises a wireless communication circuit,
    wherein the processing circuitry identifies an identification of the vehicle and broadcasts a sensing information of the vehicle from the wireless communication circuit,
    wherein the sensing information includes the plurality of real moving coordinates of the vehicle, said one time interval, and the identification of the vehicle.

6. The positioning System as claimed in claim 5, wherein the onboard positioning device comprises a wireless communication circuit, a track database, and a processing circuitry,
    wherein the wireless communication circuit receives the sensing information from the roadside device,
    wherein the processing circuitry identifies the real moving locus of the vehicle according to the identification of the vehicle in the sensing information, and records the real moving locus of the vehicle into the track database of the onboard positioning device.

7. The positioning system as claimed in claim 1, wherein the onboard positioning device comprises a wireless communication circuit, a track database, and a processing circuitry,
    wherein the processing circuitry respectively calculates a corresponding first-axis difference between each coordinate of a first axis of the plurality of real moving coordinates and each coordinate of the first axis of the plurality of positioning moving coordinates, and calculates a corresponding second-axis difference between each coordinate of a second axis of the plurality of real moving coordinates and each coordinate of the second axis of the plurality of positioning moving coordinates,
    wherein the processing circuitry calculates a first-axis calibration value according to a plurality of first-axis differences and a second-axis calibration value according to a plurality of second-axis differences, and outputs the first-axis calibration value and the second-axis calibration value as the positioning calibration value.

8. The positioning system as claimed in claim 7, wherein the wireless communication circuit of the onboard positioning device receives the real moving locus in a sensing information from the roadside device,
    wherein the processing circuitry of the onboard positioning device records the real moving locus of the vehicle into the track database of the onboard positioning device according to an identification of the vehicle in the sensing information.

9. The positioning system as claimed in claim 7, wherein the processing circuitry of the onboard positioning device calculates a plurality of the positioning coordinates of the vehicle according to the plurality of second positioning signals, and adjusts a plurality of first-axis positioning coordinates and a plurality of second-axis positioning coordinates, according to the first-axis calibration value and the second-axis calibration value to obtain the plurality of calibrated positioning coordinates respectively.

10. The positioning system as claimed in claim 1, wherein the satellite positioning system includes a first satellite, a second satellite and a third satellite, the onboard positioning device comprises a processing circuitry,
    wherein the processing circuitry calculates, based on the one time interval, a plurality of first virtual distances between the plurality of positioning moving coordinates and the first satellite, a plurality of second virtual distances between the plurality of positioning moving coordinates and the second satellite, and a plurality of third virtual distances between the plurality of positioning moving coordinates and the third satellite, wherein the processing circuitry calculates, based on the one time interval, a plurality of first actual distances between the plurality of real moving coordinates and the first satellite, a plurality of actual virtual distances between the plurality of real moving coordinates and the second satellite, and a plurality of third actual distances between the plurality of real moving coordinates and the third satellite, wherein the processing circuitry calculates a first virtual distance difference according to the plurality of first virtual distances and the plurality of first actual distances, a second virtual distance difference according to the plurality of second virtual distances and the plurality of second actual distances, and a third virtual distance difference according to the plurality of third virtual distances and the plurality of third actual distances, wherein the processing circuitry outputs the first virtual distance difference, the second virtual distance difference, and the third virtual distance difference as the positioning calibration value.

11. The positioning system as claimed in claim 10, wherein the processing circuitry of the onboard positioning device obtains a first-satellite virtual distance, a second-satellite virtual distance, and a third-satellite virtual distance based on the plurality of second positioning signals, and adjusts the first-satellite virtual distance, the second-satellite virtual distance, and the third-satellite virtual distance, according to the first virtual distance difference, the second virtual distance difference, and the third virtual distance difference, respectively, and calculates the positioning calibration value of the vehicle based on an adjusted first-satellite virtual distance, an adjusted second-satellite virtual distance, and an adjusted third-satellite virtual distance.

12. An onboard positioning device placed in a vehicle, the on board positioning device comprising:
a positioning signal receiver circuit, within one time interval, receiving a plurality of first positioning signals from a satellite positioning system;
a wireless communication circuit, obtaining a real moving locus of the vehicle within the one time interval from a roadside device, wherein the real moving locus has a plurality of real moving coordinates; and
a processing circuitry, coupled to the positioning signal receiver circuit and the wireless communication circuit,
wherein the processing circuitry records a positioning moving locus of the vehicle according to the plurality of first positioning signals, and the positioning moving locus has a plurality of positioning moving coordinates,
wherein the processing circuitry calculates a positioning calibration value according to the plurality of positioning moving coordinates of the positioning moving locus and the plurality of real moving coordinates of the real moving locus,
wherein the onboard positioning device receives a plurality of second positioning signals from the satellite positioning system,
wherein the processing circuitry calculates and outputs a plurality of calibrated positioning coordinates of the vehicle according to the plurality of second positioning signals and the positioning calibration value.

13. The onboard positioning device as claimed in claim 12, wherein the roadside device detects a plurality of relative moving coordinates of the vehicle, and obtains the real moving locus of the vehicle according to an absolute positioning coordinate of the roadside device and the plurality of relative moving coordinates of the vehicle.

14. The onboard positioning device as claimed in claim 13, wherein the roadside device uses a radar detection technique or an image recognition technology to continuously sense the plurality of relative moving coordinates of the vehicle.

15. The onboard positioning device as claimed in claim 13, wherein the roadside device transforms the plurality of relative moving coordinates into the plurality of real moving coordinates of the vehicle according to the absolute positioning coordinate.

16. The onboard positioning device as claimed in claim 13, wherein the roadside device identifies an identification of the vehicle and broadcasts a sensing information of the vehicle, wherein the sensing information includes the plurality of real moving coordinates of the vehicle, said one time interval, and the identification of the vehicle.

17. The onboard positioning device as claimed in claim 16, further comprising a track database,
wherein the wireless communication circuit of the onboard positioning device receives the sensing information from the roadside device,
wherein the processing circuitry of the onboard positioning device identifies the real moving locus of the vehicle according to the identification of the vehicle in the sensing information, and records the real moving locus of the vehicle into the track database of the onboard positioning device.

18. The onboard positioning device as claimed in claim 12, wherein the processing circuitry respectively calculates a corresponding first-axis difference between each coordinate of a first axis of the plurality of real moving coordinates and each coordinate of the first axis of the plurality of positioning moving coordinates, and calculates a corresponding second-axis difference between each coordinate of a second axis of the plurality of real moving coordinates and each coordinate of the second axis of the plurality of positioning moving coordinates,
wherein the processing circuitry calculates a first-axis calibration value according to a plurality of first-axis differences and a second-axis calibration value according to a plurality of second-axis differences, and outputs the first-axis calibration value and the second-axis calibration value as the positioning calibration value.

19. The onboard positioning device as claimed in claim 18, wherein the processing circuitry calculates a plurality of the positioning coordinates of the vehicle according to the plurality of second positioning signals, and adjusts a plurality of first-axis positioning coordinates and a plurality of second-axis positioning coordinates, according to the first-axis calibration value and the second-axis calibration value to obtain the plurality of calibrated positioning coordinates, respectively.

20. The onboard positioning device as claimed in claim 12, wherein the satellite positioning system includes a first satellite, a second satellite, and a third satellite,
wherein the processing circuitry calculates, based on the one time interval, a plurality of first virtual distances between the plurality of positioning moving coordinates and the first satellite, a plurality of second virtual distances between the plurality of positioning moving coordinates and the second satellite, and a plurality of third virtual distances between the plurality of positioning moving coordinates and the third satellite,
wherein the processing circuitry calculates, based on the one time interval, a plurality of first actual distances between the plurality of real moving coordinates and the first satellite, a plurality of actual virtual distances between the plurality of real moving coordinates and the second satellite, and a plurality of third actual distances between the plurality of real moving coordinates and the third satellite, wherein the processing circuitry calculates a first virtual distance difference according to the plurality of first virtual distances and the plurality of first actual distances, a second virtual distance difference according to the plurality of second virtual distances and the plurality of second actual distances, and a third virtual distance difference according to the plurality of third virtual distances and the plurality of third actual distances, wherein the processing circuitry outputs the first virtual distance difference, the second virtual distance difference, and the third virtual distance difference as the positioning calibration value.

21. The onboard positioning device as claimed in claim 20, wherein the processing circuitry obtains a first-satellite virtual distance, a second-satellite virtual distance, and a third-satellite virtual distance based on the plurality of second positioning signals, and adjusts the first-satellite virtual distance, the second-satellite virtual distance, and the third-satellite virtual distance, according to the first virtual distance difference, the second virtual distance difference, and the third virtual distance difference, respectively, and calculates the positioning calibration value of the vehicle based on an adjusted first-satellite virtual distance, an adjusted second-satellite virtual distance, and an adjusted third-satellite virtual distance.

22. A positioning method, adapted to an onboard positioning device in a vehicle, the positioning method comprising:
receiving a plurality of first positioning signals from a satellite positioning system within one time interval;
recording a positioning moving locus of the vehicle according to the plurality of first positioning signals, wherein the positioning moving locus has a plurality of positioning moving coordinates;
obtaining a real moving locus of the vehicle within the one time interval from a roadside device, wherein the real moving locus has a plurality of real moving coordinates;
calculating a positioning calibration value according to the plurality of positioning moving coordinates of the positioning moving locus and the plurality of real moving coordinates of the real moving locus;
receiving a plurality of second positioning signals from the satellite positioning system; and
calculating and outputting a plurality of calibrated positioning coordinates of the vehicle according to the plurality of second positioning signals and the positioning calibration value.

23. The positioning method as claimed in claim 22, wherein the roadside device detects a plurality of relative moving coordinates of the vehicle, and obtains the real moving locus of the vehicle according to an absolute positioning coordinate of the roadside device and the plurality of relative moving coordinates of the vehicle.

24. The positioning method as claimed in claim 23, wherein the roadside device uses a radar detection technique or an image recognition technology to continuously sense the plurality of relative moving coordinates of the vehicle.

25. The positioning method as claimed in claim 23, wherein the roadside device transforms the plurality of relative moving coordinates into the plurality of real moving coordinates of the vehicle according to the absolute positioning coordinate.

26. The positioning method as claimed in claim 23, wherein the roadside device identifies an identification of the vehicle and broadcasts a sensing information of the vehicle, and the sensing information includes the plurality of real moving coordinates of the vehicle, said one time interval, and the identification of the vehicle.

27. The positioning method as claimed in claim 26, the step of obtaining the real moving locus of the vehicle from the roadside device comprising:
receiving a sensing information of the vehicle from the roadside device; and
identifying and recording the real moving locus of the vehicle according to the identification of the vehicle in the sensing information.

28. The positioning method as claimed in claim 22, the step of calculating the positioning calibration value according to the plurality of positioning moving coordinates of the positioning moving locus and the plurality of real moving coordinates of the real moving locus comprising:
calculating a corresponding first-axis difference between each coordinate of a first axis of the plurality of real moving coordinates and each coordinate of the first axis of the plurality of positioning moving coordinates, and calculating a corresponding second-axis difference between each coordinate of a second axis of the plurality of real moving coordinates and each coordinate of the second axis of the plurality of positioning moving coordinates, respectively;
calculating a first-axis calibration value according to a plurality of first-axis differences and a second-axis calibration value according to a plurality of second-axis differences; and
outputting the first-axis calibration value and the second-axis calibration value as the positioning calibration value.

29. The positioning method as claimed in claim 28, the step of calculating and outputting the plurality of calibrated positioning coordinates of the vehicle according to the plurality of second positioning signals and the positioning calibration value comprising:
calculating a plurality of the positioning coordinates of the vehicle according to the plurality of second positioning signals; and
adjusting a plurality of first-axis positioning coordinates and a plurality of second-axis positioning coordinates, according to the first-axis calibration value and the second-axis calibration value to obtain the plurality of calibrated positioning coordinates, respectively.

30. The positioning method as claimed in claim 22, wherein the satellite positioning system includes a first satellite, a second satellite and a third satellite, wherein the step of calculating the positioning calibration value according to the plurality of positioning moving coordinates of the positioning moving locus and the plurality of real moving coordinates of the real moving locus comprises:
calculating, based on the one time interval, a plurality of first virtual distances between the plurality of positioning moving coordinates and the first satellite, a plurality of second virtual distances between the plurality of positioning moving coordinates and the second satellite, and a plurality of third virtual distances between the plurality of positioning moving coordinates and the third satellite;

calculating, based on the one time interval, a plurality of first actual distances between the plurality of real moving coordinates and the first satellite, a plurality of actual virtual distances between the plurality of real moving coordinates and the second satellite, and a plurality of third actual distances between the plurality of real moving coordinates and the third satellite;

calculating a first virtual distance difference according to the plurality of first virtual distances and the plurality of first actual distances, a second virtual distance difference according to the plurality of second virtual distances and the plurality of second actual distances, and a third virtual distance difference according to the plurality of third virtual distances and the plurality of third actual distances; and outputting the first virtual distance difference, the second virtual distance difference, and the third virtual distance difference as the positioning calibration value.

31. The positioning method as claimed in claim 30, the step of calculating and outputting the plurality of calibrated positioning coordinates of the vehicle according to the plurality of second positioning signals and the positioning calibration value comprising:

obtaining a first-satellite virtual distance, a second-satellite virtual distance, and a third-satellite virtual distance based on the plurality of second positioning signals;

adjusting the first-satellite virtual distance, the second-satellite virtual distance, and the third-satellite virtual distance, according to the first virtual distance difference, the second virtual distance difference, and the third virtual distance difference, respectively; and calculating the positioning calibration value of the vehicle based on an adjusted first-satellite virtual distance, an adjusted second-satellite virtual distance, and an adjusted third-satellite virtual distance.

* * * * *